United States Patent
Wu et al.

(10) Patent No.: US 10,165,545 B2
(45) Date of Patent: Dec. 25, 2018

(54) PF/PO CALCULATIONS AND USE THEREOF FOR EDRX

(71) Applicants: Chunlin Wu, Beijing (CN); Yanji Zhang, Beijing (CN); Nokia Solutions and Networks Oy, Espoo (FI)

(72) Inventors: Chunlin Wu, Beijing (CN); Yanji Zhang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/762,464

(22) PCT Filed: Sep. 25, 2015

(86) PCT No.: PCT/CN2015/090809
§ 371 (c)(1),
(2) Date: Mar. 22, 2018

(87) PCT Pub. No.: WO2017/049625
PCT Pub. Date: Mar. 30, 2017

(65) Prior Publication Data
US 2018/0279256 A1    Sep. 27, 2018

(51) Int. Cl.
*H04W 68/00*     (2009.01)
*H04W 76/28*     (2018.01)
(Continued)

(52) U.S. Cl.
CPC ......... *H04W 68/005* (2013.01); *H04W 68/02* (2013.01); *H04W 76/28* (2018.02); *H04W 72/0446* (2013.01)

(58) Field of Classification Search
None
See application file for complete search history.

(56) References Cited

U.S. PATENT DOCUMENTS

2018/0176883 A1*  6/2018  Fujishiro ........... H04W 52/0225

FOREIGN PATENT DOCUMENTS

| CN | 104105111 | 10/2014 |
| CN | 104350795 | 2/2015 |

(Continued)

OTHER PUBLICATIONS

International Search Report and Written Opinion received for corresponding Patent Cooperation Treaty Application No. PCT/CN2015/090809, dated Jun. 29, 2016, 8 pages.

(Continued)

*Primary Examiner* — Suhail Khan
(74) *Attorney, Agent, or Firm* — Harrington & Smith (57) ABSTRACT

A specific hyper frame to be used for paging information in a cycle is determined. The cycle includes multiple eDRX periods, and includes a number of hyper frames. Each of the multiple eDRX periods has a same duration. The determining uses at least a value corresponding to an identification of a UE and the duration to determine the specific hyper frame. An index is determined of a first paging frame and paging subframe, in multiple consecutive paging frames, in the specific hyper frame. One or more of the consecutive paging frames and corresponding paging subframes in the specific hyper frame are monitored by using the determined index of the first paging frame and paging subframe. Apparatus, methods, programs, and computer program products are disclosed.

19 Claims, 5 Drawing Sheets

(51) Int. Cl.
*H04W 68/02* (2009.01)
*H04W 72/04* (2009.01)

(56) References Cited

FOREIGN PATENT DOCUMENTS

WO 2014071551 5/2014
WO 2014083723 6/2014

OTHER PUBLICATIONS

Qualcomm Inc. Considerations on RAN based and CN based approaches for extended idle mode DRX 3GPP TSG-RAN WG2 Meeting #91 R2-153697 28, Aug. 2015 (Aug. 28, 2015).

* cited by examiner

PF/PO CALCULATIONS AND USE THEREOF FOR EDRX

RELATED APPLICATION

This application was originally filed as PCT Application No. PCT/CN2015/090809 filed Sep. 25, 2015.

TECHNICAL FIELD

This invention relates generally to paging in wireless systems and, more specifically, relates to determination of where a page or pages (e.g., via paging frames, PFs, or paging occasions, POs) can occur, e.g., for enhanced discontinuous reception (eDRX).

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the detailed description section.

A Rel-13 work item (WI) on radio access network (RAN) enhancements for extended DRX in LTE was agreed in RAN #67. See, e.g., RP-150493, Qualcomm Incorporated, "New WI Proposal: RAN enhancements for extended DRX in LTE", 3GPP TSG RAN Meeting #67, Shanghai, China, 9-12 Mar. 2015. This WI had the objectives of extending DRX for UEs in IDLE mode and CONNECTED mode for UE power saving. RAN2 #90 agreed the length of extended DRX will be extended beyond the current SFN limit of 10.24 s and may be increased on the order of minutes. See, e.g., R2-153002, ETSI MCC, Draft Report of 3GPP TSG RAN WG2 meeting #90, Fukuoka, Japan, May 25-29, 2015.

In addition, once the UE wakes up, the UE determines the PF/PO based on the legacy DRX formula/cycle (i.e., no change on the paging occasion computation). It is also agreed that to improve paging reliability, the paging message can be repeated on different paging occasions determined using the legacy DRX formula for a certain time window.

Furthermore, it was agreed that a hyper-SFN based scheme is adopted for the UE to determine when to wake up to accommodate eDRX in order of minutes. See, e.g., R2-15xxxx, ETSI MCC, "Draft Report of 3GPP TSG RAN WG2 meeting #91", Beijing, China, Aug. 24-28, 2015. When the UE shall wake up for detecting the potential paging is decided by the regular DRX cycle mechanism in conjunction with this new hyper-SFN.

Although there is agreement that the hyper-SFN based solution will be applied for paging the UE configured with eDRX, which hyper paging frame and which PF/PO(s) within the hyper paging frame the UE shall listen to in the PDCCH for potential paging are not discussed yet.

BRIEF SUMMARY

This section is intended to include examples and is not intended to be limiting.

In an exemplary embodiment, a method is disclosed that comprises determining a specific hyper frame to be used for paging information in a cycle comprising a plurality of extended discontinuous reception periods. The cycle comprises a number of hyper frames and each of the plurality of extended discontinuous reception periods has a same duration. The determining uses at least a value corresponding to an identification of a user equipment and the duration of an extended discontinuous reception period to determine the specific hyper frame. The method comprises determining an index of a first paging frame and paging subframe, in a plurality of consecutive paging frames, in the specific hyper frame, and monitoring at least one of the consecutive paging frames and corresponding paging subframes in the specific hyper frame by using the determined index of the first paging frame and paging subframe.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: determining a specific hyper frame to be used for paging information in a cycle comprising a plurality of extended discontinuous reception periods, wherein the cycle comprises a number of hyper frames and each of the plurality of extended discontinuous reception periods has a same duration, and wherein the determining uses at least a value corresponding to an identification of a user equipment and the duration of an extended discontinuous reception period to determine the specific hyper frame; determining an index of a first paging frame and paging subframe, in a plurality of consecutive paging frames, in the specific hyper frame; and monitoring at least one of the consecutive paging frames and corresponding paging subframes in the specific hyper frame by using the determined index of the first paging frame and paging subframe.

An example of a computer program product includes a computer-readable storage medium bearing computer program code embodied therein for use with a computer. The computer program code includes: code for determining a specific hyper frame to be used for paging information in a cycle comprising a plurality of extended discontinuous reception periods, wherein the cycle comprises a number of hyper frames and each of the plurality of extended discontinuous reception periods has a same duration, and wherein the determining uses at least a value corresponding to an identification of a user equipment and the duration of an extended discontinuous reception period to determine the specific hyper frame; code for determining an index of a first paging frame and paging subframe, in a plurality of consecutive paging frames, in the specific hyper frame; and code for monitoring at least one of the consecutive paging frames and corresponding paging subframes in the specific hyper frame by using the determined index of the first paging frame and paging subframe.

In another example of an embodiment, an apparatus comprises means for determining a specific hyper frame to be used for paging information in a cycle comprising a plurality of extended discontinuous reception periods, wherein the cycle comprises a number of hyper frames and each of the plurality of extended discontinuous reception periods has a same duration, and wherein the determining uses at least a value corresponding to an identification of a user equipment and the duration of an extended discontinuous reception period to determine the specific hyper frame; means for determining an index of a first paging frame and paging subframe, in a plurality of consecutive paging frames, in the specific hyper frame; and means for monitoring at least one of the consecutive paging frames and corresponding paging subframes in the specific hyper frame by using the determined index of the first paging frame and paging subframe.

Another exemplary embodiment is a method, comprising sending to user equipment signaling defining a cycle comprising a plurality of discontinuous reception periods. The cycle comprises a number of hyper frames and each of the plurality of discontinuous reception periods has a same duration. The sending further comprises sending in the signaling the duration of an extended discontinuous reception period. The method comprises, for a specific one of the user equipment, performing the following: determining a specific hyper frame to be used for paging the specific user equipment using at least a value corresponding to an identification of the specific user equipment and the duration; determining an index of a first paging frame and paging subframe in the specific hyper frame to be used for paging the specific user equipment; and in response to a determination that paging is to be sent to the specific user equipment, sending paging, to the specific user equipment, in at least the first paging frame and paging subframe in the specific hyper frame by using the determined index of the first paging frame and paging subframe.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: sending to user equipment signaling defining a cycle comprising a plurality of discontinuous reception periods, wherein the cycle comprises a number of hyper frames and each of the plurality of discontinuous reception periods has a same duration, and the sending further comprises sending in the signaling the duration of an extended discontinuous reception period; for a specific one of the user equipment, performing the following: determining a specific hyper frame to be used for paging the specific user equipment using at least a value corresponding to an identification of the specific user equipment and the duration; determining an index of a first paging frame and paging subframe in the specific hyper frame to be used for paging the specific user equipment; and in response to a determination that paging is to be sent to the specific user equipment, sending paging, to the specific user equipment, in at least the first paging frame and paging subframe in the specific hyper frame by using the determined index of the first paging frame and paging subframe.

An example of a computer program product includes a computer-readable storage medium bearing computer program code embodied therein for use with a computer. The computer program code includes: code for sending to user equipment signaling defining a cycle comprising a plurality of discontinuous reception periods, wherein the cycle comprises a number of hyper frames and each of the plurality of discontinuous reception periods has a same duration, and the sending further comprises sending in the signaling the duration of an extended discontinuous reception period; code, for a specific one of the user equipment, for performing the following: determining a specific hyper frame to be used for paging the specific user equipment using at least a value corresponding to an identification of the specific user equipment and the duration; determining an index of a first paging frame and paging subframe in the specific hyper frame to be used for paging the specific user equipment; and in response to a determination that paging is to be sent to the specific user equipment, sending paging, to the specific user equipment, in at least the first paging frame and paging subframe in the specific hyper frame by using the determined index of the first paging frame and paging subframe.

In another example of an embodiment, an apparatus comprises means for sending to user equipment signaling defining a cycle comprising a plurality of discontinuous reception periods, wherein the cycle comprises a number of hyper frames and each of the plurality of discontinuous reception periods has a same duration, and the sending further comprises sending in the signaling the duration of a discontinuous reception period; means, for a specific one of the user equipment, for performing the following, comprising: means for determining a specific hyper frame to be used for paging the specific user equipment using at least a value corresponding to an identification of the specific user equipment and the duration; means for determining an index of a first paging frame and paging subframe in the specific hyper frame to be used for paging the specific user equipment; and means, responsive to a determination that paging is to be sent to the specific user equipment, for sending paging, to the specific user equipment, in at least the first paging frame and paging subframe in the specific hyper frame by using the determined index of the first paging frame and paging subframe.

BRIEF DESCRIPTION OF THE DRAWINGS

In the attached Drawing Figures:

FIG. 2 is a modified version of a figure from R2-153697, "Qualcomm Incorporated", "Considerations on RAN based and CN based approaches for extended idle mode DRX", 3GPP TSG-RAN WG2 Meeting #91, Beijing, China, Aug. 24-28, 2015, entitled "FIG. 1: RAN based solution for extended I-DRX", where the modifications are placement of reference numerals on the figure;

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for HPF/PF/PO calculation for DRX. Additional description of these techniques and is presented after a system into which the exemplary embodiments may be used is described.

Figure 1:
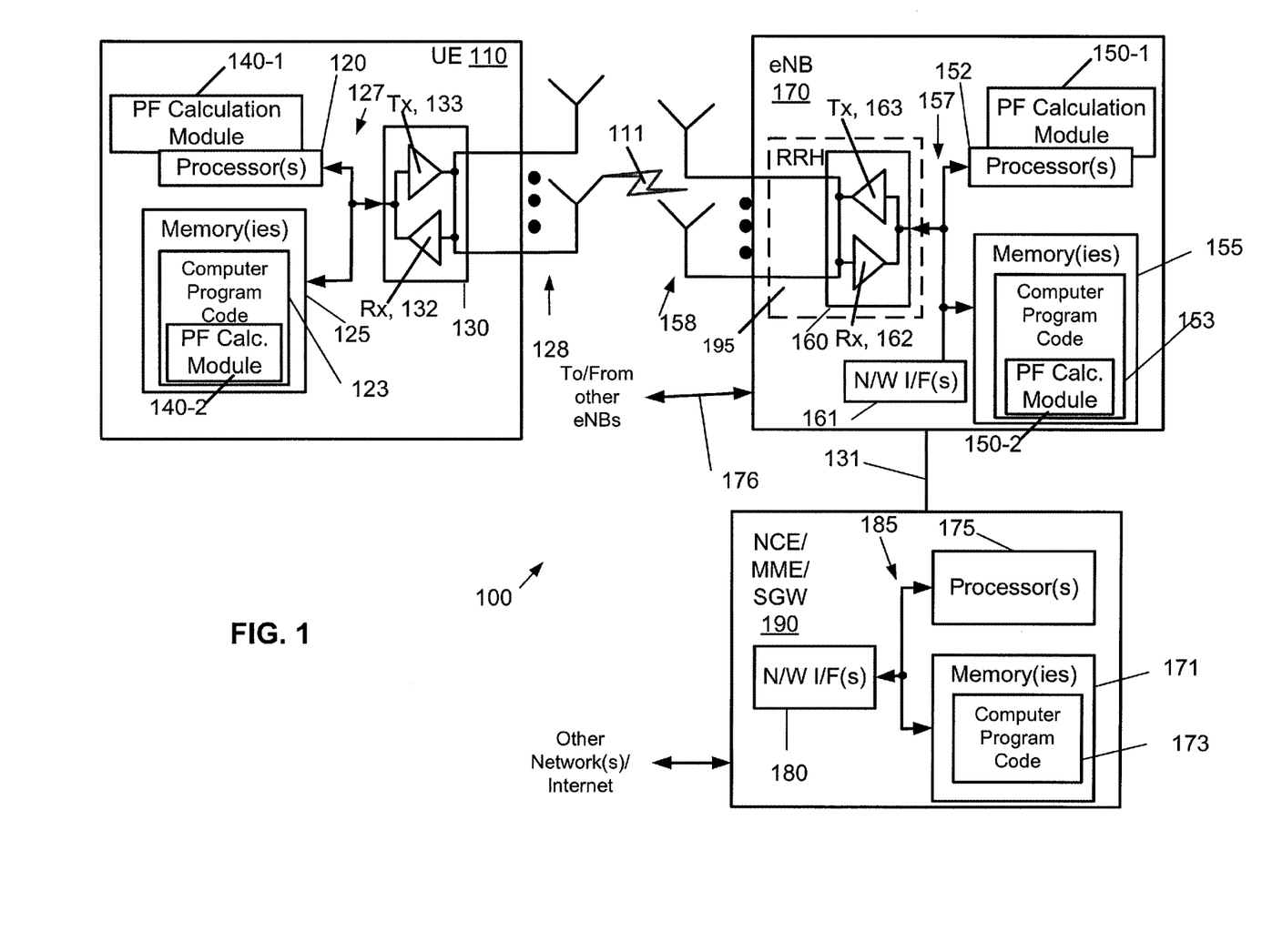
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a PF calculation (calc.) module 140, comprising one of or both parts 140-1 and/or 140-2, which may be implemented in a number of ways. The PF calculation module 140 may be implemented in hardware as PF calculation module 140-1, such as being implemented as part of the one or more processors 120. The PF calculation module 140-1 may be implemented also as an integrated circuit or through other hardware such as a programmable gate array. In another example, the PF calculation module 140 may be implemented as PF calculation module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a PF calculation (calc.) module 150, comprising one of or both parts 150-1 and/or 150-2, which may be implemented in a number of ways. The PF calculation module 150 may be implemented in hardware as PF calculation module 150-1, such as being implemented as part of the one or more processors 152. The PF calculation module 150-1 may be implemented also as an integrated circuit or through other hardware such as a programmable gate array. In another example, the PF calculation module 150 may be implemented as PF calculation module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions.

The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

As previously described, although there is agreement that the hyper-SFN based solution will be applied for paging the UE configured with eDRX, it has not yet been discussed which hyper paging frame and which PF/PO(s) within the hyper paging frame the UE shall listen to in the PDCCH for potential paging.

As an introduction, one hyper radio frame corresponds to a cycle of 10.24 s, which contains the radio frames starting from SFN #0 to SFN #1023. The H-SFN is the index of the hyper radio frame, and the length (that is, the numbers of bits) of H-SFN depends on the maximum value of extended DRX cycle in idle mode and is still under discussion.

One Hyper Paging Frame (HPF) or Paging Hyper Frame (PHF) is one hyper radio frame, which may contain multiple paging occasions. The UE may need to monitor one or multiple PF/PO(s) within an HPF per eDRX cycle. The PF and PO are determined by the legacy formulae using the DRX parameters provided in System Information (SI).

Qualcomm (R2-153697) briefly described the hyper SFN based implementation but without any indication as to how to determine the hyper paging frame and how the multiple PF/PO(s) are configured. See, e.g., R2-153697, "Qualcomm Incorporated", "Considerations on RAN based and CN based approaches for extended idle mode DRX", 3GPP TSG-RAN WG2 Meeting #91, Beijing, China, Aug. 24-28, 2015. This document stated the following: "The UE, in its specific H-SFN (i.e., its paging hyperframe—PH), locates the paging resource indices (PO and PF) using the legacy DRX formula. To support page retransmission within a PH, the eNB may configure multiple PFs, separated by a legacy DRX period. This is illustrated in FIG. 1." FIG. 1 in that document is reproduced here as FIG. 2. Additionally, reference numbers have been placed on FIG. 1 from R2-153697.

It is noted that the terminology used herein is slightly different from the quoted text above from R2-153697. The term "PH" is not used herein (except in reference to FIG. 2, since this is a reproduced version of FIG. 1 of R2-153697), and instead, the "paging hyper frames" are referred to as hyper radio frames or hyper paging frames. The "specific H-SFN" in R2-153697 could therefore be referred to as a specific Hyper Radio Frame.

Figure 2:
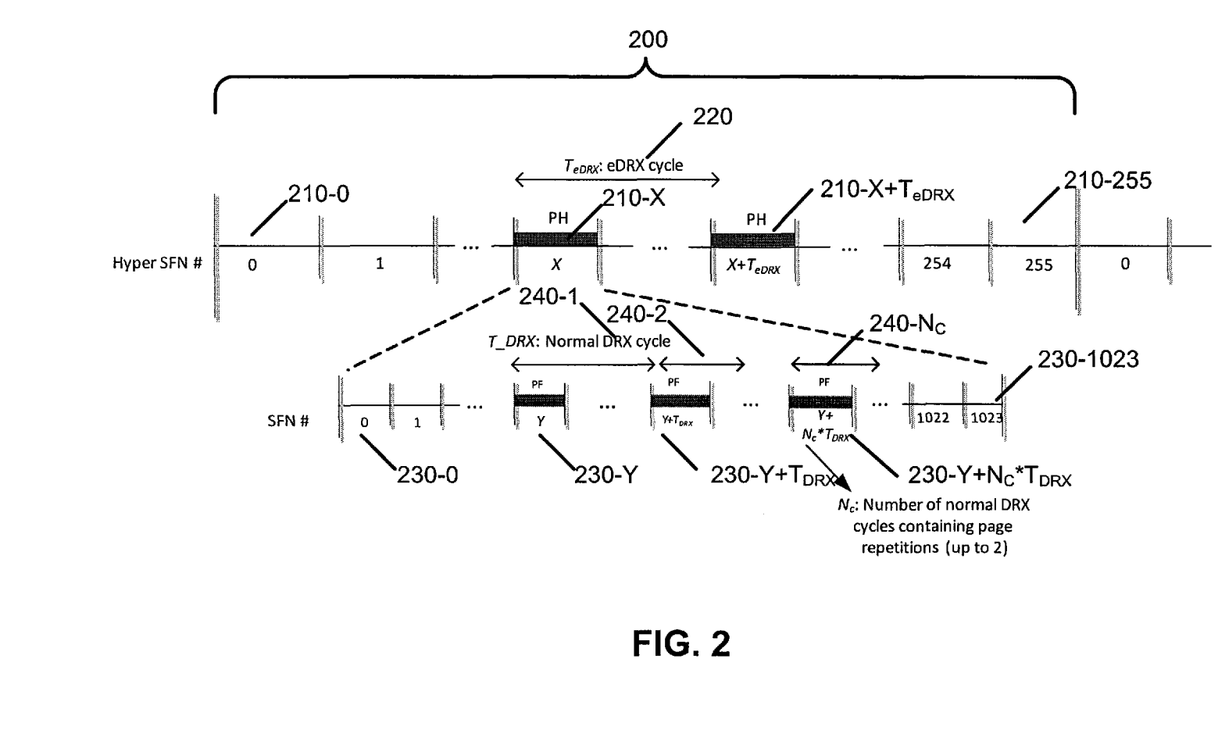

Turning to FIG. 2, a hyper radio frame cycle 200 includes 256 Hyper-SFNs (also called Hyper Radio Frames), numbered as H-SFN 210-0 through 210-255 (which corresponding to Hyper SFNs 0 to 255) in this example. A Hyper SFN number is broadcast in SIB and may consist of 6-8 bits (e.g., to cover a range of up to 10-40 minutes). An eDRX cycle 220 has a time period, $T_{eDRX}$, which occurs starting at PH 210-X and ends before PH 210-X+$T_{eDRX}$. A PH 2 210 (such as PH 210-X) includes 1024 subframes 230-0 through 230-1023 (corresponding to SFNs 0 to 2013). A normal DRX cycle 240 has a period of T_DRX. In this example there are normal DRX cycles 240-1, 240-2, through 240-$N_C$. The normal DRX cycle 240-1 starts at the beginning of subframe 230-Y and ends before subframe 230-Y+$T_{DRX}$; the normal DRX cycle 240-starts at the beginning of subframe 230-Y+$T_{DRX}$ and ends before subframe 230-Y+2*$T_{DRX}$; and the normal DRX cycle 240-Y+$N_C$*$T_{DRX}$ starts at the beginning of subframe 230-Y+$N_C$*$T_{DRX}$ and ends before subframe 230-Y+($N_C$+1)*$T_{DRX}$.

An exemplary embodiment herein proposes that the UE 110 would understand when it shall wake up according to the extended DRX cycle. In particular, the HPF may be given by following, where the index H-SFN is being determined:

$$J \bmod eT = \text{UE\_ID} \bmod eT, \qquad \text{(Equation 1)}$$

where:
J is the H-SFN of the HPF (that is, the index in hyper paging frame numbers);
mod is a modulo operation;
eT is the eDRX cycle duration (e.g., see reference 220 of FIG. 2) in terms of numbers of hyper paging frames (1, 2, 4, 8, . . . , 256) (Note: It is assumed that the signaling of the number of hyper paging frames for an eDRX cycle duration will use 8 bits, although this is not a limitation); and
eDRX cycle is eT*1024 radio frames.

As an example, if UE_ID mod eT is 3, and eT is 8, then the hyper paging frames will be the hyper radio frames which have H-SFN #3, H-SFN #11, H-SFN #19, . . . until the maximum number of hyper paging frames is reached. In this example, "H-SFN" means hyper frame number. More specifically, J mod eT=UE_ID mod eT=3, and eT=8, and therefore J mod 8 is any of the following: 3 mod 8=3, 11 mod 8=3, 19 mod 8=3, . . . , and the like.

It is possible to use repetitions of paging information, e.g., where paging is repeated over multiple subframes. Equation 1 ensures all the repetitions fall into the same hyper frame.

The index of the first paging occasion of the paging repetitions could be derived from a second paging DRX cycle with the legacy paging DRX cycle length and the paging repetition window (i.e., number of repetitions). The second DRX cycle is the paging cycle determined according to 3GPP TS 36.304, i.e., the UE specific DRX value, if allocated by upper layers, and a default DRX value broadcast in system information; or a UE-specific paging cycle configured from the network (e.g., MME 190) which would always be present if the UE is configured with eDRX; or the longest legacy paging cycle (i.e., 2560 ms) regardless of default paging cycle broadcasted in the cell, e.g., as in following equation:

$$I = (\text{UE\_ID} \bmod (K-M+1)), \qquad \text{(Equation 2)}$$

where:
K is the total number of potential paging occasions within the hyper paging frame calculated according to the second paging DRX cycle length;
I is the index of the first paging occasion of the paging repetitions within the hyper paging frame (e.g., starting from zero) that the UE shall monitor paging;
M is the number of paging repetitions within the hyper paging frame; and UE_ID is the IMSI unless a USIM is not present, then UE_ID=0.

It is noted that the IMSI is described in, for instance, 3GPP TS 23.003 V13.2.0 (2015-06). The IMSI is limited to 15 digits by 3GPP TS 23.003.

Consider the following example. The following is assumed:

K=16, which means there are 16 paging occasion within the hyper paging frame, i.e., the second DRX paging cycle is 640 ms (10240/640=16);

M=3, which means the eNB 170 repeats the paging transmission 3 times within the hyper paging frame (i.e., paging repletion window is 3 legacy paging cycles); and therefore (for a particular UE_ID):

K−M+1=14, I=UE_ID mod (K−M+1)=UE_ID mod (14)=3.

Figure 3:
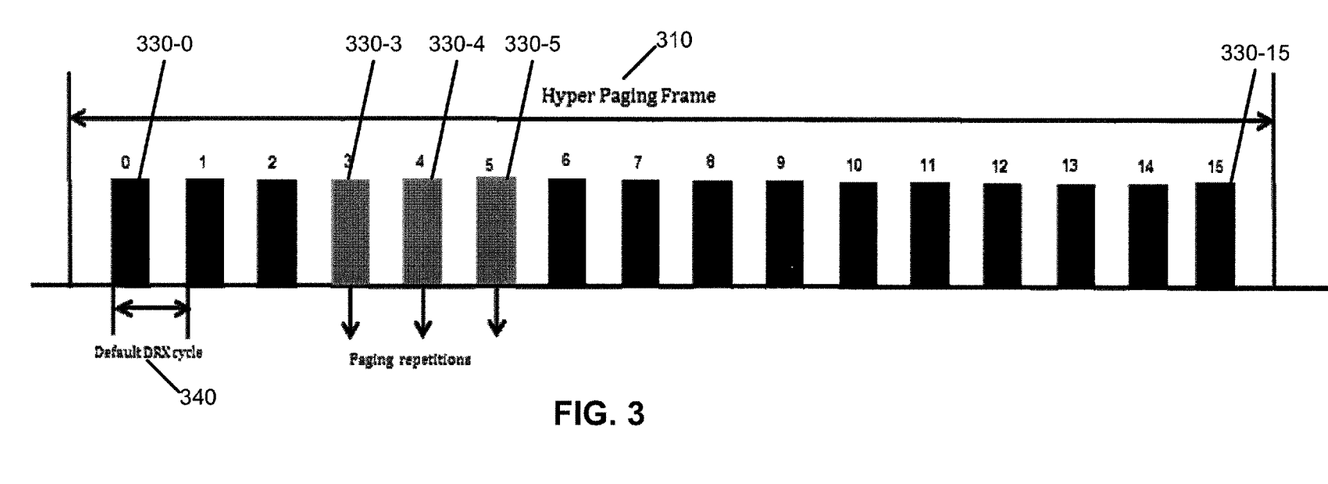
FIG. 3 is a figure illustrating a hyper paging frame for a specific example.

Then, the paging repetitions start from the fourth paging occasion within the paging hyper frame. This is illustrated by FIG. 3, which illustrates a hyper paging frame 310 for the specific example presented above. Note that the user equipment could monitor multiple paging occasions in multiple normal paging cycles, as illustrated by FIG. 2. That is, for the first paging occasion example of number $4^{th}$, the next paging occasion would occur $T_{DRX}$ later after the $4^{th}$ paging occasion, then $2*T_{DRX}$ after the $4^{th}$ paging occasion, or the $5^{th}$ PF/PO and the $6^{th}$ PF/PO within the HPF . . . and the like using the terminology in FIG. 2. Note that the PF/PO calculation is based on legacy behavior specified in 3GPP TS 36.304. See, e.g., 3GPP TS 36.304 V12.5.0 (2015-06). According to 36.304, the UE may use DRX in idle mode in order to reduce power consumption. One Paging Occasion (PO) is a subframe where there may be P-RNTI transmitted on PDCCH addressing the paging message. One Paging Frame (PF) is one Radio Frame, which may contain one or multiple Paging Occasion(s). When DRX is used the UE needs only to monitor one PO per DRX cycle.

More specifically, according to the eDRX configuration (length in number of hyper paging frames) the UE 110 can calculate the H-SFN for a hyper paging frame, and according to DRX configuration, the UE 110 can determine how many "PF/POs", e.g., 16 occasions with 640 ms DRX (10240/640) according to the formula from 3GPP TS 36.304. However, the UE 110 will not monitor all those 16 "PF/PO"; instead, the UE will calculate according to the formula proposed in this invention to monitor only 4th, 5th, and 6th PF/PO. In other words, only the 4th, 5th, 6th paging occasions within the hyper paging frame are the real PF/PO for the UE. In FIG. 3, a DRX cycle 340 is shown, and such cycle would exist for the paging occasions 330-0 through 330-15 respectively. The paging occasions 330-3, 330-4, and 330-5 with paging repetitions are shown. As described, based on the algorithm above, the UE 110 would monitor the paging occasions 330-3, 330-4, and 330-5 for paging purposes (and the eNB 170 would possibly send paging information in these paging occasions).

Another example with longest legacy DRX cycle of 2560 ms for the second DRX cycle for paging frame and subframe calculation within the hyper paging frame:

K=4, which means there are 4 paging occasions within the hyper paging frame, 10240/2560=4;

M=2, which means the eNB 170 repeats the paging transmission 2 times within the hyper paging frame (i.e., paging repetition window is 2 legacy paging cycles); and therefore (for a particular UE_ID):

K−M+1=3, I=UE_ID mod (K−M+1)=UE_ID mod (3)=2.

Then, the paging repetitions start from the $2^{nd}$ paging occasion within the hyper frame, and repeat at the $3^{rd}$ paging occasion using the legacy formula from 3GPP TS 36.304 assuming a 2560 ms paging cycle.

The new hyper paging frame related parameters described above may be broadcast via system information (e.g., in the SIB), which may include the H-SFN (that is, the index of the hyper frame), the eDRX cycle configuration in the number of hyper frames and the number of paging repetitions (e.g., retransmissions by the eNB 170) within a hyper paging frame.

In an exemplary embodiment, the number of paging repetitions and/or second DRX cycle for repetition for paging frame/paging occasion calculation within the hyper paging frame may be defined in a specification or signaled from the network.

In another exemplary embodiment, the number of paging repetitions may be derived from the default paging cycle of a cell if the default paging cycle of a cell is shorter than the UE specific paging cycle.

In another exemplary embodiment, the second DRX cycle for paging frame/paging occasion calculation within the hyper paging frame is a UE-specific paging cycle which is always provided by the MME if eDRX is configured, instead of using shortest of UE specific paging cycle and default paging cycle.

The equations for deriving the hyper paging frame and the specific POs which paging repetitions occur within the hyper paging frame every eDRX cycle may be defined in a specification.

Figure 4:
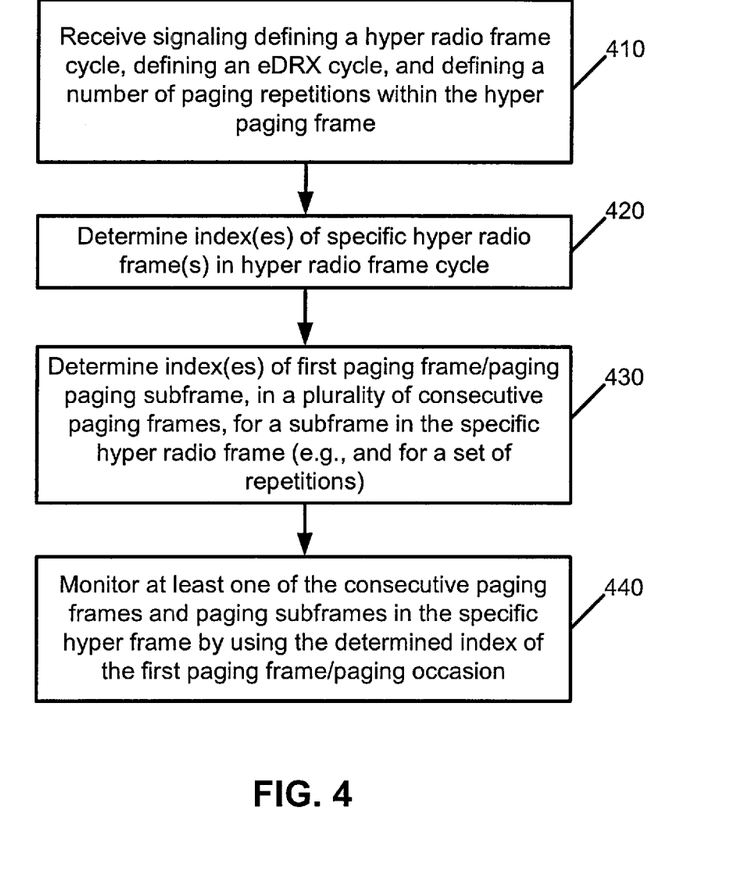
FIG. 4 is a logic flow diagram performed by user equipment for PF/PO calculations and use thereof for eDRX, and illustrates the operation of an exemplary method, a result of execution of computer program instructions embodied on a computer readable memory, functions performed by logic implemented in hardware, and/or interconnected means for performing functions in accordance with exemplary embodiments.

Turning to FIG. 4, this figure is a logic flow diagram performed by user equipment for PF/PO calculations and use thereof for eDRX. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the PF calculation module 140 may include multiples ones of the blocks in FIG. 4, where each included block is an interconnected means for performing the function in the block. The blocks in FIG. 4 are assumed to be performed by the UE 110, e.g., under control of the PF calculation module 140 at least in part.

In block 410, the user equipment 110 receives signaling defining a hyper radio frame cycle 200, defining an eDRX cycle 220, and defining a number of paging repetitions within the hyper paging frame (i.e., M from Equation 2). These may be received, e.g., via System Information such as via SIB and/or MIB. It is noted that a number defining a total number of paging occasions within a hyper paging frame (i.e., K from Equation 2) may be calculated according to a paging cycle, e.g. with 640 ms paging cycle, there are 16 paging occasions in a hyper paging frame. The information defining a hyper radio frame cycle 200 can be a 6 or 8 bit (as examples) defining the number of hyper radio frames in a hyper radio frame cycle 200, e.g., the H-SFN (that is, the number of hyper frames in an eDRX cycle). H-SFN is hyper frame number with the value of 0, 1, 2, . . . 255 with, e.g., 8 bits. H-SFN is broadcast the same value for the whole 1024 frames, and then is increased by one for the next 1024 frames, and the like, until the maximum value of H-SFN is reached (where the H-SFN is reset to zero). The information defining the eDRX cycle 220 can be information to define eT from Equation 1, such as the number of H-SFN for an eDRX cycle duration, will it is assumed will use 8 bits (although this is not a limitation herein). eDRX cycle configuration should be per UE, e.g., configured by MME 190 (e.g., or other part of network 100), through the eNB 170 via, e.g., NAS.

In block 420, the user equipment 110 determines index(es) of specific hyper radio frame(s) in hyper radio frame cycle. Equation 1 is used to determine the index(es). In the example presented above, if UE_ID mod eT is 3, and eT is 8, then the hyper paging frames will be the hyper radio frames which have H-SFN #3, H-SFN #11, H-SFN #19, . . . until the maximum number of hyper paging frames is reached. The indexes therefore are 3, 11, 19, . . . , until the maximum number of hyper paging frames is reached.

Block 430 has the user equipment determining an index of a first paging frame (e.g., PF) and paging subframe (e.g., for PO), in a plurality of consecutive paging frames/paging subframes, in the specific hyper radio frame (e.g., and for a set of repetitions). It is assumed herein that the paging frame and paging subframe are paired, such that there is only one paging subframe within a paging frame for a certain UE. Thus, the index is for the first paging frame, and the paging frame and paging subframes are assumed to be paired. Equation 2 is used to determine the index of the first paging frame/paging occasion in block 430. Although repetitions are described in reference to FIG. 3, such repetitions are not necessary and are optional (e.g., M could be set to zero). To know when to wake up, the UE 110 needs to know which subframe of which frame of which hyper paging frame might have paging and should be monitored. See 3GPP TS 36.304 section 7 for the paging frame/subframe calculation within a single "Radio Frame". In block 440, the user equipment monitors at least one of the consecutive paging frames and corresponding paging subframes in the plurality of paging frames and paging subframes in the specific hyper paging frame by using the determined index of the first paging frame/paging occasion. It is noted that in the case of cell reselection, the UE may not start monitoring the paging from the first PF/PO from the new cell and instead may begin at some other PF/PO.

Blocks 430 and 440 would be performed for each of the indexes of the hyper paging frames being examined, such as indexes 3, 11, 19, . . . , in the example presented above. That is, blocks 430 and 440 would be performed for the hyper paging frame having the hyper SFN #3, then blocks 430 and 440 would be performed for the hyper paging frame having the hyper SFN #11, then blocks 430 and 440 would be performed for the hyper paging frame having the hyper SFN #19, and the like.

Figure 5:
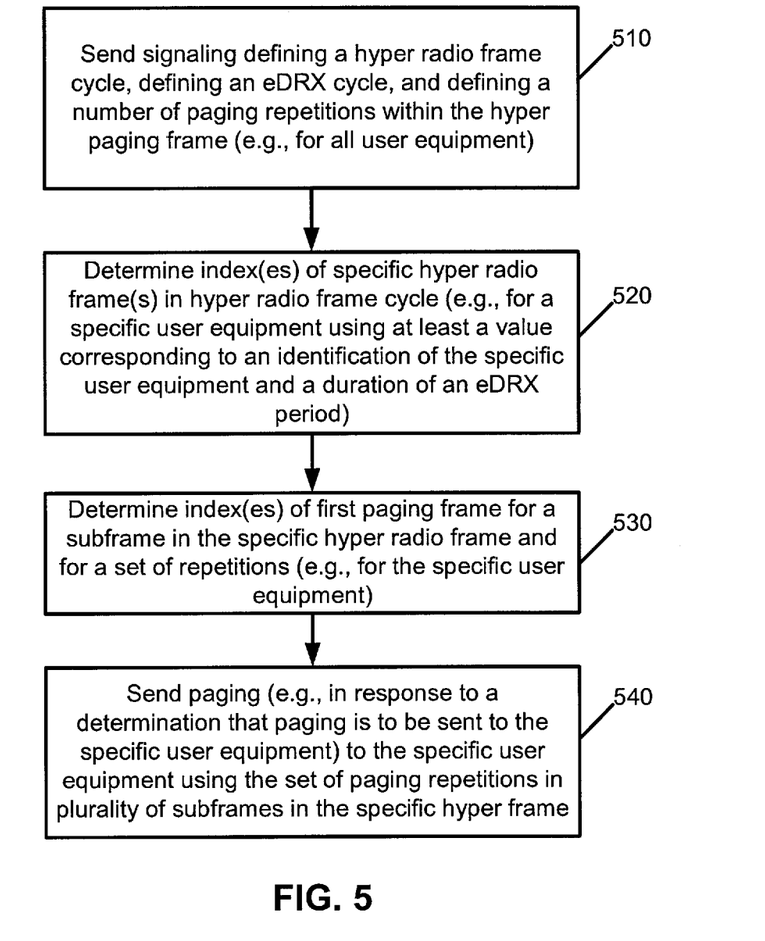
FIG. 5 is a logic flow diagram performed by a base station for PF/PO calculations for eDRX, and illustrates the operation of an exemplary method, a result of execution of computer program instructions embodied on a computer readable memory, functions performed by logic implemented in hardware, and/or interconnected means for performing functions in accordance with exemplary embodiments

Turning now to FIG. 5, FIG. 5 is a logic flow diagram performed by a base station for PF/PO calculations for eDRX. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the PF calculation module 150 may include multiples ones of the blocks in FIG. 5, where each included block is an interconnected means for performing the function in the block. The blocks in FIG. 5 are assumed to be performed by a base station such as eNB 170, e.g., under control of the PF calculation module 150 at least in part. The base station here is assumed to be an eNB, although other base stations may be used.

As an initial matter, the eNB 170 has to know the UE_ID, thus the PF/PO would be aligned between the UE and eNB. The eNB 170 pages the UE 110 from one of the PFs, but the UE should monitor all the PFs for potential paging.

In block 510, the eNB 170 sends signaling defining a hyper radio frame cycle, defining an eDRX cycle, and defining a number of paging repetitions within the hyper paging frame (e.g., for all of the user equipment). It is noted that the eDRX cycle configuration should be per UE, configured by, e.g., an MME. Other parameters such as default DRX cycle, number of repetitions, and the like could be cell specific broadcasted by eNB. The number of paging repetitions may also be derived from the default DRX cycle of a cell if the default DRX cycle of a cell is shorter than the UE specific DRX cycle. The remaining blocks of FIG. 5 are performed for a specific UE 110 (e.g., and could be performed for other UEs 110 too).

In block 520, the eNB 170 determines index(es) of specific hyper radio frame(s) in a hyper radio frame cycle (e.g., for a specific user equipment). As described above, this is based on Equation 1 for a particular UE 110. Block 520 is for a specific user equipment and uses at least a value corresponding to an identification of the specific user equipment and a duration of an eDRX period, as described above.

In block 530, the eNB 170 determines index(es) of a first paging frame/paging occasion for a subframe in the specific hyper radio frame, and also for a set of repetitions (e.g., for the user equipment). Typically, a set includes multiple repetitions, but could include no repetitions (e.g., a single paging occasion would not be repeated). As described above, this is based on Equation 2 for the particular UE.

In block 540, the eNB 170, in response to a determination that paging is to be sent to the specific user equipment, sends paging to the user equipment in one or a plurality of the paging frame/paging subframes in the specific hyper frame. This block (block 540) would also be repeated for other hyper frames, if necessary.

Without in any way limiting the scope, interpretation, or application of the claims appearing below, a technical effect and advantage of one or more of the example embodiments disclosed herein is the specific PF(s) within the hyper paging frame could be coordinated and aligned between the eNB 170 and UE 110 to improve the robustness of the paging reception in case of extended DRX cycle in idle mode. Another technical effect and advantage of one or more of the example embodiments disclosed herein is these techniques ensure uniform distribution of paging occasions of the UEs within the cell.

The specific PF(s) within the Hyper Paging Frame could be coordinated and aligned between eNB and UE to improve the robustness of the paging reception in case of extended DRX cycle in idle mode, and this ensures uniform distribution of paging occasions of the UEs within the cell.

The following are examples.

Example 1

A method, comprising: determining a specific hyper frame to be used for paging information in a cycle comprising a plurality of extended discontinuous reception periods, wherein the cycle comprises a number of hyper frames and each of the plurality of extended discontinuous reception periods has a same duration, and wherein the determining uses at least a value corresponding to an identification of a user equipment and the duration of an extended discontinuous reception period to determine the specific hyper frame; determining an index of a first paging frame and paging subframe, in a plurality of consecutive paging frames, in the specific hyper frame; and monitoring at least one of the consecutive paging frames and corresponding paging subframes in the specific hyper frame by using the determined index of the first paging frame and paging subframe.

Example 2

The method of example 1, wherein the consecutive paging frames comprise a set of repetitions, wherein the first paging frame and paging subframe is a first one of the set of paging repetitions, and wherein monitoring comprises monitoring at least one paging frame and paging subframe in the set of paging repetitions.

Example 3

The method of any of examples 1 to 2, further comprising receiving via signaling the duration. Example 4. The method of example 3, wherein receiving the duration comprises one of receiving the duration via a network of which the base station is a part. Example 5. The method of any of examples 1 to 4, wherein the identification of the user equipment is an international mobile subscriber identity unless a universal subscriber identity module is not present, then the identification is zero.

Example 6

The method of any of examples 1 to 5, wherein determining a specific hyper frame further comprises determining the specific hyper frame using the following equation: $J \bmod eT = UE\_ID \bmod eT$, where: J is an index in terms of hyper subframe numbers of the specific hyper frame, mod is a modulo operation, and eT is the duration of a discontinuous reception period in terms of a number of hyper frames in the discontinuous reception period.

Example 7

The method of any of examples 1 to 6, wherein determining a specific hyper frame further comprises using an equation to determine an index of the specific hyper frame, and using the equation to determine indexes of a plurality of other specific hyper frames of the cycle of hyper frames, and wherein determining an index of a first paging frame and paging subframe in the specific hyper frame and monitoring at least one of the consecutive paging frames and corresponding paging subframes in the specific hyper frame are performed for the plurality of other specific hyper frames of the cycle of hyper frames.

Example 8

The method of any of examples 1 to 7, wherein the consecutive paging frames comprise a set of repetitions, wherein determining an index of a first paging frame and paging subframe ensures all the repetitions fall into a same hyper frame.

Example 9

The method of any of examples 1 to 7, wherein the consecutive paging frames comprise a set of repetitions, wherein determining an index of the paging frames and paging subframes takes into account a second paging cycle for paging frame and paging subframe calculation within the hyper frame, a number of the repetitions, and a mobile identity for the user equipment.

Example 10

The method of example 9, wherein the second paging cycle is a default paging cycle broadcasted from a network, a user equipment specific paging cycle, or a longest legacy paging cycle.

Example 11

The method of any of examples 1 to 10, wherein determining an index of a first paging frame and paging subframe further comprises determining the index of the first paging frame and paging subframe using the following equation: $I = (UE\_ID \bmod (K-M+1))$, where K is a total number of paging occasions within the specific hyper frame, I is the index of a first paging occasion of paging repetitions within the specific hyper frame, starting from zero, M is a number of paging repetitions within the hyper frame, and UE_ID is an international mobile subscriber identity unless a universal subscriber identity module is not present, then UE_ID=0.

Example 12

The method of example 11, further comprising deriving the number of paging repetitions from the second paging cycle for a paging frame and paging subframe calculation within the hyper frame.

Example 13

The method of any of examples 11 or 12, further comprising receiving the number of paging repetitions within the hyper frame via signaling.

Example 14

The method of example 13, wherein receiving the number of paging repetitions comprises one of receiving the number of repetitions in system information or receiving the number of repetitions in one or both of a system information block and a master information block.

Example 15

The method of any of examples 1 to 14, wherein a total number of paging occasions within the specific hyper frame is determined by a paging cycle.

Example 16

The method of any of examples 1 to 15, wherein paging frames for monitoring are calculated using 3GPP TS 36.304, but wherein the user equipment only performs monitoring, based on an equation, of a number of paging repetitions within the specific hyper frame, the number of paging repetitions being less than the paging frames calculated using 3GPP TS 36.304, and the user equipment does not monitor all the paging frames calculated using 3GPP TS 36.304.

Example 17

An apparatus, comprising: means for determining a specific hyper frame to be used for paging information in a cycle comprising a plurality of extended discontinuous reception periods, wherein the cycle comprises a number of hyper frames and each of the plurality of extended discontinuous reception periods has a same duration, and wherein the determining uses at least a value corresponding to an identification of a user equipment and the duration of an extended discontinuous reception period to determine the specific hyper frame; means for determining an index of a first paging frame and paging subframe, in a plurality of consecutive paging frames, in the specific hyper frame; and means for monitoring at least one of the consecutive paging frames and corresponding paging subframes in the specific hyper frame by using the determined index of the first paging frame and paging subframe. Example 18. The apparatus of example 17, further comprising means for performing the method of any of examples 2 to 16. Example 19. A user equipment comprising the apparatus of any of examples 17 or 18.

Example 20

A method, comprising: sending to user equipment signaling defining a cycle comprising a plurality of discontinuous reception periods, wherein the cycle comprises a number of hyper frames and each of the plurality of discontinuous reception periods has a same duration, and the sending further comprises sending in the signaling the duration of a discontinuous reception period; for a specific one of the user equipment, performing the following: determining a specific hyper frame to be used for paging the specific user equipment using at least a value corresponding to an identification of the specific user equipment and the duration; determining an index of a first paging frame and paging subframe in the specific hyper frame to be used for paging the specific user equipment; and in response to a determination that paging is to be sent to the specific user equipment, sending paging, to the specific user equipment, in at least the first paging frame and paging subframe in the specific hyper frame by using the determined index of the first paging frame and paging subframe.

Example 21

The method of example 20, wherein the first paging frame and paging subframe is one of a set of paging repetitions in the plurality of subframes, and wherein sending comprises sending paging in the first paging frame and paging subframe in the set of paging repetitions.

Example 22

The method of any of examples 20 to 21, wherein the method is performed by a base station and wherein sending the duration comprises sending through the base station the duration from a network to user equipment.

Example 23

The method of any of examples 20 to 22, wherein the identification of the user equipment is an international mobile subscriber identity unless a universal subscriber identity module is not present, then the identification is zero.

Example 24

The method of any of examples 20 to 23, wherein determining a specific hyper frame further comprises determining the specific hyper frame using the following equation: $J \bmod eT = UE\_ID \bmod eT$, where: J is an index in terms of hyper subframe numbers of the specific hyper frame, mod is a modulo operation, and eT is the duration of a discontinuous reception period in terms of a number of hyper frames in the discontinuous reception period.

Example 25

The method of any of examples 20 to 24, wherein determining a specific hyper frame further comprises using an equation to determine an index of the specific hyper frame, and using the equation to determine indexes of a plurality of other specific hyper frames of the cycle of hyper frames useful for sending paging to the specific user equipment in response to a determination that paging is to be sent to the specific user equipment.

Example 26

The method of any of examples 20 to 25, wherein determining an index of a first paging frame further comprises determining the index of the first paging frame using the following equation: $I = (UE\_ID \bmod (K-M+1))$, where K is a total number of paging occasions within the specific hyper frame, I is the index of a first paging occasion of paging repetitions within the specific hyper frame, starting from zero, M is a number of paging repetitions within the hyper frame, and UE_ID is an international mobile subscriber identity unless a universal subscriber identity module is not present, then UE_ID=0.

Example 27

The method of example 26, further comprising deriving the number of paging repetitions from the default paging cycle of a cell if the default paging cycle of a cell is shorter than a user equipment specific paging cycle.

Example 28

The method of any of examples 26 or 27, further comprising sending to the user equipment the number of paging repetitions within the hyper frame via signaling.

Example 29

The method of example 28, wherein sending the number of paging repetitions comprises one of sending the number of repetitions in system information or sending the number of repetitions in one or both of a system information block and a master information block.

Example 30

An apparatus, comprising: means for sending to user equipment signaling defining a cycle comprising a plurality of discontinuous reception periods, wherein the cycle comprises a number of hyper frames and each of the plurality of discontinuous reception periods has a same duration, and the sending further comprises sending in the signaling the duration of a discontinuous reception period; means, for a specific one of the user equipment, for performing the following, comprising: means for determining a specific hyper frame to be used for paging the specific user equipment using at least a value corresponding to an identification of the specific user equipment and the duration; means for determining an index of a first paging frame and paging subframe in the specific hyper frame to be used for paging the specific user equipment; and means, responsive to a determination that paging is to be sent to the specific user equipment, for sending paging, to the specific user equipment, in at least the first paging frame and paging subframe in the specific hyper frame by using the determined index of the first paging frame and paging subframe.

Example 31

The apparatus of example 30, further comprising means for performing the method of any of examples 21 to 29. Example 32. A base station comprising the apparatus of any of examples 30 or 31.

Example 33

A communication system comprising an apparatus of any of examples 17 or 18 and an apparatus of any of examples 30 or 31.

Example 34

A computer program comprising program code for executing the method according to any of examples 1 to 16 or 20 to 29. Example 35. The computer program according to example 34, wherein the computer program is a computer program product comprising a computer-readable medium bearing computer program code embodied therein for use with a computer.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
calc. calculation
DRX discontinuous reception
eDRX enhanced DRX
eNB (or eNodeB) evolved Node B (e.g., an LTE base station)
ETSI European telecommunications standards institute
HPF hyper paging frame
I/F interface
IMSI international mobile subscriber identity
LTE long term evolution
MIB master information block
MCC mobile competence centre (center)
MME mobility management entity
NAS non-access stratum
NCE network control element
N/W network
PDCCH physical downlink control channel
P-RNTI paging-radio network temporary identifier
PF paging frame
PH paging hyper frame
PO paging occasion
RAN radio access network
RAN2 RAN working group 2
Rel release
RRH remote radio head
Rx receiver or reception
s seconds
SFN subframe number
SGW serving gateway
SI system information
SIB system information block
TSG technical specification group
Tx transmitter or transmission
UE user equipment (e.g., a wireless, typically mobile device)
USIM universal subscriber identity module
WI work item

What is claimed is:

1. An apparatus, comprising:
at least one processor, and
at least one memory including computer program code, the at least one memory and the computer program code configured to, with the at least one processor, to cause the apparatus to perform at least to:
determining a specific hyper frame to be used for paging information in a cycle comprising a plurality of extended discontinuous reception periods, wherein the cycle comprises a number of hyper frames and each of the plurality of extended discontinuous reception periods has a same duration, and wherein the determining uses at least a value corresponding to an identification of a user equipment and the duration of an extended discontinuous reception period to determine the specific hyper frame;
determining an index of a first paging frame and paging subframe, in a plurality of consecutive paging frames, in the specific hyper frame; and
monitoring at least one of the consecutive paging frames and corresponding paging subframes in the specific hyper frame by using the determined index of the first paging frame and paging subframe,
wherein the determining of the index of the first paging frame and the paging subframe further comprises determining the index of the first paging frame and the paging subframe using the following equation:

$I = (\mathrm{UE\_ID} \bmod (K-M+1))$, where K is a total number of paging occasions within the specific hyper frame, I is the index of a first paging occasion of paging repetitions within the specific hyper frame, starting from zero, M is a number of paging repetitions within the specific hyper frame, and UE_ID is an international mobile subscriber identity unless a universal subscriber identity module is not present, then UE_ID=0.

2. The apparatus of claim 1, wherein the consecutive paging frames comprise a set of repetitions, wherein the first paging frame and paging subframe is a first one of the set of paging repetitions, and wherein monitoring comprises monitoring at least one paging frame and paging subframe in the set of paging repetitions.

3. The apparatus of claim 1, the at least one memory and the computer program code configured to, with the at least one processor, to further cause the apparatus to perform at least receiving the duration via signaling.

4. The apparatus of claim 3, wherein the duration is received via a network of which the base station is a part.

5. The apparatus of claim 1, wherein the identification of the user equipment is an international mobile subscriber identity, unless a universal subscriber identity module is not present in which case the identification is zero.

6. The apparatus of claim 1, wherein determining a specific hyper frame further comprises determining the specific hyper frame using the following equation: J mod eT=UE_ID mod eT, where: J is an index in terms of hyper subframe numbers of the specific hyper frame, mod is a modulo operation, and eT is the duration of a discontinuous reception period in terms of a number of hyper frames in the discontinuous reception period.

7. The apparatus of claim 1, wherein determining a specific hyper frame further comprises using an equation to determine an index of the specific hyper frame, and using the equation to determine indexes of a plurality of other specific hyper frames of the cycle of hyper frames, and wherein determining an index of a first paging frame and paging subframe in the specific hyper frame and monitoring at least one of the consecutive paging frames and corresponding paging subframes in the specific hyper frame are performed for the plurality of other specific hyper frames of the cycle of hyper frames.

8. The apparatus of claim 1, wherein the consecutive paging frames comprise a set of repetitions, wherein determining an index of a first paging frame and paging subframe ensures all the repetitions fall into a same hyper frame.

9. The apparatus of claim 1, wherein the consecutive paging frames comprise a set of repetitions, wherein determining an index of the paging frames and paging subframes takes into account a second paging cycle for paging frame and paging subframe calculation within the hyper frame, a number of the repetitions, and a mobile identity for the user equipment.

10. The apparatus of claim 9, wherein the second paging cycle is a default paging cycle broadcasted from a network, a user equipment specific paging cycle, or a longest legacy paging cycle.

11. The apparatus of claim 1, the at least one memory and the computer program code configured to, with the at least one processor, to further cause the apparatus to perform at least:

deriving the number of paging repetitions from a second paging cycle for a paging frame and paging subframe calculation within the hyper frame.

12. The apparatus of claim 1, the at least one memory and the computer program code configured to, with the at least one processor, to further cause the apparatus to perform at least receiving the number of paging repetitions within the hyper frame via signaling.

13. The apparatus of claim 12, wherein receiving the number of paging repetitions comprises one of:
receiving the number of repetitions in system information, and
receiving the number of repetitions in at least one of: a system information block and a master information block.

14. The apparatus of claim 1, wherein a total number of paging occasions within the specific hyper frame is determined by a paging cycle.

15. The apparatus of claim 1, wherein the apparatus comprises a user equipment.

16. A method comprising:
determining a specific hyper frame to be used for paging information in a cycle comprising a plurality of extended discontinuous reception periods, wherein the cycle comprises a number of hyper frames and each of the plurality of extended discontinuous reception periods has a same duration, and wherein the determining uses at least a value corresponding to an identification of a user equipment and the duration of an extended discontinuous reception period to determine the specific hyper frame;
determining an index of a first paging frame and paging subframe, in a plurality of consecutive paging frames, in the specific hyper frame; and
monitoring at least one of the consecutive paging frames and corresponding paging subframes in the specific hyper frame by using the determined index of the first paging frame and paging subframe,
wherein the determining of the index of the first paging frame and the paging subframe further comprises determining the index of the first paging frame and the paging subframe using the following equation:

$I = (\mathrm{UE\_ID} \bmod (K-M+1))$, where K is a total number of paging occasions within the specific hyper frame, I is the index of a first paging occasion of paging repetitions within the specific hyper frame, starting from zero, M is a number of paging repetitions within the specific hyper frame, and UE_ID is an international mobile subscriber identity unless a universal subscriber identity module is not present, then UE_ID=0.

17. The method of claim 16, wherein determining a specific hyper frame further comprises determining the specific hyper frame using the following equation:

$J \bmod eT = \mathrm{UE\_ID} \bmod eT$, where: J is an index in terms of hyper subframe numbers of the specific hyper frame, mod is a modulo operation, and eT is the duration of a discontinuous reception period in terms of a number of hyper frames in the discontinuous reception period.

18. The method of claim 16, wherein determining a specific hyper frame further comprises using an equation to determine an index of the specific hyper frame, and using the equation to determine indexes of a plurality of other specific hyper frames of the cycle of hyper frames, and wherein determining an index of a first paging frame and paging subframe in the specific hyper frame and monitoring at least one of the consecutive paging frames and corresponding paging subframes in the specific hyper frame are performed for the plurality of other specific hyper frames of the cycle of hyper frames.

19. An apparatus, comprising:
at least one processor, and
at least one memory including computer program code, the at least one memory and the computer program code configured to, with the at least one processor, to cause the apparatus to perform at least:
sending to user equipments signaling defining a cycle comprising a plurality of discontinuous reception periods, wherein the cycle comprises a number of hyper frames and each of the plurality of discontinuous reception periods has a same duration, and the sending further comprises sending in the signaling the duration of a discontinuous reception period;
for a specific one of the user equipments:
determining a specific hyper frame to be used for paging the specific user equipment using at least a value corresponding to an identification of the specific user equipment and the duration;
determining an index of a first paging frame and paging subframe in the specific hyper frame to be used for paging the specific user equipment; and
responsive to a determination that paging is to be sent to the specific user equipment, sending paging, to the specific user equipment, in at least the first paging frame and the aging subframe in the specific hyper frame by using the determined index of the first paging frame and the paging subframe,
wherein the determining of the index of the first paging frame and the paging subframe further comprises determining the index of the first paging frame and the paging subframe using the following equation:

$$I=(UE\_ID \bmod(K-M+1)),$$

where K is a total number of paging occasions within the specific hyper frame, I is the index of a first paging occasion of paging repetitions within the specific hyper frame, starting from zero, M is a number of paging repetitions within the specific hyper frame, and UE_ID is an international mobile subscriber identity unless a universal subscriber identity module is not present, then UE_ID=0.

* * * * *

UNITED STATES PATENT AND TRADEMARK OFFICE
CERTIFICATE OF CORRECTION

PATENT NO. : 10,165,545 B2
APPLICATION NO. : 15/762464
DATED : December 25, 2018
INVENTOR(S) : Chunlin Wu et al.

It is certified that error appears in the above-identified patent and that said Letters Patent is hereby corrected as shown below:

In Claim 19:
Column 22, Line 7, "aging" should be deleted and --paging-- should be inserted.

Signed and Sealed this
Nineteenth Day of February, 2019

Andrei Iancu
*Director of the United States Patent and Trademark Office*